United States Patent
Miyata et al.

(10) Patent No.: US 9,386,437 B2
(45) Date of Patent: Jul. 5, 2016

(54) DETERMINATION OF ORDER OF TRANSMISSION DESTINATION

(71) Applicant: NEC BIGLOBE, LTD., Shinagawa-ku, Tokyo (JP)

(72) Inventors: Michitaro Miyata, Tokyo (JP); Tomonari Kamba, Tokyo (JP); Kyoji Hirata, Tokyo (JP); Takahiro Murakami, Tokyo (JP); Kenji Shioume, Tokyo (JP); Tadashi Haneishi, Tokyo (JP)

(73) Assignee: BIGLOBE Inc., Tokyo (JP)

( * ) Notice: Subject to any disclaimer, the term of this patent is extended or adjusted under 35 U.S.C. 154(b) by 0 days.

(21) Appl. No.: 14/251,196

(22) Filed: Apr. 11, 2014

(65) Prior Publication Data

US 2014/0323078 A1 Oct. 30, 2014

(30) Foreign Application Priority Data

Apr. 26, 2013 (JP) .................................. 2013-093509

(51) Int. Cl.
- H04M 11/04 (2006.01)
- H04M 1/00 (2006.01)
- H04B 7/00 (2006.01)
- H04M 3/42 (2006.01)
- H04L 29/06 (2006.01)
- H04W 4/22 (2009.01)
- H04W 76/00 (2009.01)

(52) U.S. Cl.
CPC .............. H04W 4/22 (2013.01); H04W 76/007 (2013.01)

(58) Field of Classification Search
CPC .......... H04M 2250/10; H04M 1/0266; H04W 76/007; H04W 4/22
USPC ................. 455/404.1, 556.1–556.2, 521, 455/414.1–414.3
See application file for complete search history.

(56) References Cited

U.S. PATENT DOCUMENTS

| | | | |
|---|---|---|---|
| 2003/0065788 A1* | 4/2003 | Salomaki | 709/227 |
| 2009/0197563 A1* | 8/2009 | Yasrebi et al. | 455/404.1 |
| 2010/0149975 A1* | 6/2010 | Tripathi et al. | 370/230.1 |
| 2010/0175000 A1* | 7/2010 | Gupta et al. | 715/753 |
| 2010/0184416 A1* | 7/2010 | Gupta et al. | 455/414.3 |
| 2011/0111736 A1* | 5/2011 | Dalton et al. | 455/414.1 |
| 2013/0172051 A1* | 7/2013 | Cudak et al. | 455/566 |

FOREIGN PATENT DOCUMENTS

| | | |
|---|---|---|
| JP | 11-055389 A | 2/1999 |
| JP | 11177721 A | 7/1999 |
| JP | 2001000167 A | 1/2001 |

(Continued)

OTHER PUBLICATIONS

Communication dated Apr. 7, 2015, issued by the Japanese Patent Office in counterpart Application No. 2013093509.

(Continued)

*Primary Examiner* — Dung Hong
(74) *Attorney, Agent, or Firm* — Sughrue Mion, PLLC

(57) ABSTRACT

A memory unit stores a plurality of transmission destinations. A control unit determines an order of priority of transmission destinations based on states of the plurality of transmission destinations that are stored by the memory unit, and then, upon receiving predetermined input, originates a call to the transmission destination having the highest order of priority of transmission destinations that was determined.

3 Claims, 31 Drawing Sheets

| display name | object person ID | telephone number | order of priority of the initial setting |
|---|---|---|---|
| Papa | A | 111-111-1111 | 2 |
| Mama | B | 222-222-2222 | 1 |
| Grandpa | C | 333-333-3333 | 3 |

(56) References Cited

FOREIGN PATENT DOCUMENTS

| | | |
|---|---|---|
| JP | 2001-274875 A | 10/2001 |
| JP | 2002-290627 A | 10/2002 |
| JP | 2003-309667 A | 10/2003 |
| JP | 2006-157111 A | 6/2006 |
| JP | 2007-221190 A | 8/2007 |
| JP | 2008-245110 A | 10/2008 |
| JP | 2009-246865 A | 10/2009 |
| JP | 2010-154125 A | 7/2010 |
| JP | 2010-154181 A | 7/2010 |
| JP | 2011-182347 A | 9/2011 |

OTHER PUBLICATIONS

Communication dated Jan. 26, 2016 from the Japanese Patent Office in counterpart application No. 2013-093509.

* cited by examiner

Fig.3

| display name | object person ID | telephone number | order of priority of the initial setting |
|---|---|---|---|
| Papa | A | 111-111-1111 | 2 |
| Mama | B | 222-222-2222 | 1 |
| Grandpa | C | 333-333-3333 | 3 |

Fig.4

| presence | order of priority |
|---|---|
| telephone-able | 1 |
| telephone-unable | 2 |

Fig.5

| object person ID | presence |
|---|---|
| A | telephone-able |
| B | telephone-able |
| C | telephone-unable |

Fig.6

| order of priority | object person ID |
|---|---|
| 1 | B |
| 2 | A |
| 3 | C |

| object person ID | presence |
|---|---|
| A | telephone-able |
| B | telephone-able |
| C | telephone-able |

| order of priority | object person ID |
|---|---|
| 1 | B |
| 2 | A |
| 3 | C |

| object person ID | presence |
|---|---|
| A | telephone-able |
| B | telephone-unable |
| C | telephone-able |

| order of priority | object person ID |
|---|---|
| 1 | A |
| 2 | C |
| 3 | B |

| object person ID | presence |
|---|---|
| A | telephone-unable |
| B | telephone-unable |
| C | telephone-able |

| order of priority | object person ID |
|---|---|
| 1 | C |
| 2 | B |
| 3 | A |

Fig.14

| object person ID | presence |
|---|---|
| A | telephone-able |
| B | telephone-able |
| C | telephone-unable |

Fig.15

| call originator ID | object person ID |
|---|---|
| a | A |
| | B |
| | C |
| b | D |
| | F |
| ⋮ | ⋮ |

Fig.23

| object person | schedule | | |
|---|---|---|---|
| | start time | end time | event |
| A | 10:00 | 12:00 | in-company meeting |
| | 15:00 | 17:00 | arrangements with client |
| ⋮ | ⋮ | | |

Fig.24

| event | presence |
|---|---|
| in-company meeting | telephone-unable |
| arrangements with client | telephone-unable |
| . . . | . . . |

Fig.26

| display name | object person ID | type | telephone number/ addresse | order of priority of initial setting |
|---|---|---|---|---|
| Papa's telephone | A | telephone | 111-111-1111 | 2 |
| Papa's mail | | message | A@mail.***.jp | |
| Mama's telephone | B | telephone | 222-222-2222 | 1 |
| Mama's mail | | message | B@mail.***.jp | |

Fig.27

| presence | order of priority |
|---|---|
| telephone-able | 1 |
| message-able | 2 |
| telephone-unable, message-unable | 3 |

Fig.28

| object person ID | presence |
|---|---|
| A | telephone-able, message-able |
| B | telephone-unable, message-able |

Fig.29

| order of priority | object person ID | type |
|---|---|---|
| 1 | A | telephone |
| 2 | B | message |
| 3 | A | message |
| 4 | B | telephone |

DETERMINATION OF ORDER OF TRANSMISSION DESTINATION

This application is based upon and claims the benefit of priority from Japanese Patent Application No. 2013-093509 filed on Apr. 26, 2013, the content of which is incorporated by reference.

TECHNICAL FIELD

The present invention relates to a communication terminal, a communication system, a communication method, and a program for performing communication.

BACKGROUND ART

In recent years, techniques have been considered (for example, refer to Patent Literature 1) whereby, in the event of an emergency, a plurality of transmission destinations that have been registered in advance are called in order of higher order of priority that was determined in advance. The use of such a technique can facilitate call origination to the user's desired transmission destination in the event of an emergency, and further, enables call origination to the transmission destination that has the next highest order of priority when connection is not established to a called destination.

CITATION LIST

Patent Literature

Patent Literature 1: Japanese Unexamined Patent Application Publication No. 2003-309667

SUMMARY OF INVENTION

Technical Problem

In this type of technique, call origination is implemented to a transmission destination having a high order of priority even when the user of the transmission destination is in a meeting and therefore unable to take the call. Because this user is unable to take the call, call origination is implemented to the transmission destination having the next highest order of priority. In this case, the problem arises in which unnecessary waiting time occurs from the call origination to a transmission destination that is unable to take the call until call origination to the next transmission destination.

It is therefore an object of the present invention to provide a communication terminal, a communication system, a communication method, and a program that provide a solution to the above-described problem.

Solution to Problem

The communication terminal of the present invention includes:

a memory unit that stores a plurality of transmission destinations; and a control unit that, based on the states of the plurality of transmission destinations, determines an order of priority of transmission destinations and that, upon receiving predetermined input, implements call origination to the transmission destination having the highest order of priority of transmission destinations that was determined.

In addition, the communication terminal includes:

a memory unit that stores a plurality of transmission destinations;

a display unit that displays transmission destinations that are stored by the memory unit; and a control unit that: based on the states of the plurality of transmission destinations, determines an order of priority of transmission destinations, upon receiving predetermined input, displays on the display unit transmission destinations in order of the order of priority of transmission destinations that was determined, and upon selection of a displayed transmission destination, implements call origination to the transmission destination that was selected.

In addition, the communication system is a communication system that has a first communication terminal that implements call origination and a plurality of second communication terminals that are the transmission destinations of the call origination, the communication system including:

memory means; and control means that: based on the states of the plurality of second communication terminals, determines an order of priority of transmission destinations, and when the first communication terminal receives predetermined input, implements call origination to, from among the plurality of second communication terminals that are stored in association with the first communication terminal in the memory means, the second communication terminal having the highest order of priority of transmission destinations that was determined.

Alternatively, the communication system is a communication system having a first communication terminal that implements call origination and a plurality of second communication terminals that are the transmission destinations of the call origination, the communication system including:

memory means that stores a plurality of the transmission destinations;

display means that displays transmission destinations that are stored by the memory means; and control means that: based on the states of the plurality of second communication terminals, determines an order of priority of transmission destinations; when the first communication terminal receives predetermined input, displays on the display means, from among the plurality of second communication terminals that are stored in association with the first communication terminal in the memory means, transmission destinations in order of the order of priority of transmission destinations that was determined; and upon selection of a transmission destination that is displayed, implements call origination to the second communication terminal that is the transmission destination that was selected.

In addition, the communication method of the present invention includes:

a process of storing a plurality of transmission destinations;

a process of determining an order of priority of transmission destinations based on the states of the plurality of transmission destinations; and a process of, upon receiving predetermined input, implementing call origination to the transmission destination having the highest order of priority of transmission destinations that was determined.

Alternatively, the communication method includes:

a process of storing a plurality of transmission destinations;

a process of displaying transmission destinations that are stored;

a process of determining an order of priority of transmission destinations based on the states of the plurality of transmission destinations;

a process of, upon receiving predetermined input, displaying transmission destinations in order of the order of priority of transmission destinations that was determined; and a process of, when a transmission destination that is displayed is selected, implementing call origination to the transmission destination that was selected.

In addition, the program of the present invention is a program for causing a computer to execute:

a procedure of storing a plurality of transmission destinations;

a procedure of determining an order of priority of transmission destinations based on the states of the plurality of transmission destinations; and a procedure of, upon receiving predetermined input, implementing call origination to the transmission destination having the highest order of priority of transmission destinations that was determined.

Alternatively, the program of the present invention is a program for causing a computer to execute:

a procedure of storing a plurality of transmission destinations;

a procedure of displaying the transmission destinations that are stored;

a procedure of, based on the states of the plurality of transmission destinations, determining an order of priority of transmission destinations;

a procedure of, upon receiving predetermined input, displaying transmission destinations in order of the order of priority of transmission destinations that was determined; and a procedure of, upon selection of a transmission destination that is displayed, implementing call origination to the transmission destination that was selected.

Advantageous Effects of Invention

The present invention as described hereinabove enables the elimination of unnecessary waiting time in emergency call origination.

The above and other objects, features, and advantages of the present invention will become apparent from the following description with reference to the accompanying drawings which illustrate an example of the present invention.

BRIEF DESCRIPTION OF DRAWINGS

FIG. 3 shows an example of an object person table that is stored in the memory unit shown in FIG. 2.

FIG. 4 shows an example of the condition table that is stored in the memory unit shown in FIG. 2.

FIG. 5 shows an example of the presence table that is stored in the memory unit shown in FIG. 2.

FIG. 6 shows an example of the order table that is stored in the memory unit shown in FIG. 2.

FIG. 14 shows an example of the presence table that is stored in the memory unit shown in FIG. 13.

FIG. 15 shows an example of the user management table that is stored in the memory unit shown in FIG. 13.

FIG. 23 shows an example of the schedule table that is stored in the memory unit shown in FIG. 22.

FIG. 24 shows an example of the event table that is stored in the memory unit shown in FIG. 22.

FIG. 26 shows another example of the object person table that is stored in the memory unit shown in FIG. 2.

FIG. 27 shows another example of the condition table that is stored in the memory unit shown in FIG. 2.

FIG. 28 shows another example of the presence table that is stored in the memory unit shown in FIG. 2.

FIG. 29 shows another example of the order table that is stored in the memory unit shown in FIG. 2.

EXEMPLARY EMBODIMENTS

Exemplary embodiments of the present invention are next described with reference to the accompanying drawings.

First Exemplary Embodiment

Figure 1:
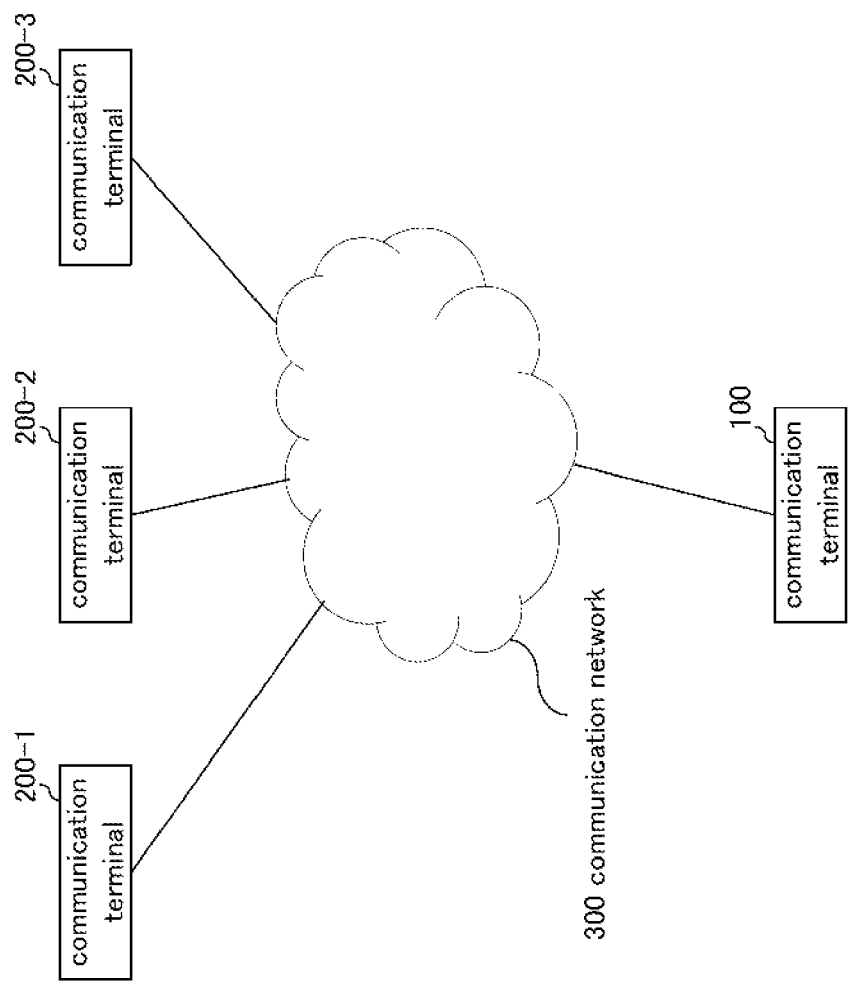
FIG. 1 shows the first exemplary embodiment of the communication system of the present invention.

Referring to FIG. 1, the first exemplary embodiment of the communication system of the present invention is shown in which communication terminals 100 and 200-1-200-3 are capable of communication with each other by way of communication network 300. In the embodiment shown in FIG. 1, an example is shown having three communication terminals 200-1-200-3, but the number of communication terminals is not limited.

Communication terminal 100 is a communication device equipped with an emergency call origination function. For example, communication terminal 100 is a communication device (first communication terminal) belonging to a child.

Communication terminals 200-1-200-3 are communication devices that are the objects of emergency transmission destinations of communication terminal 100. For example, communication terminals 200-1-200-3 are communication devices (second communication terminals) belonging to the guardians (for example, the father, mother, and grandparents) of the child who has communication terminal 100.

Figure 2:
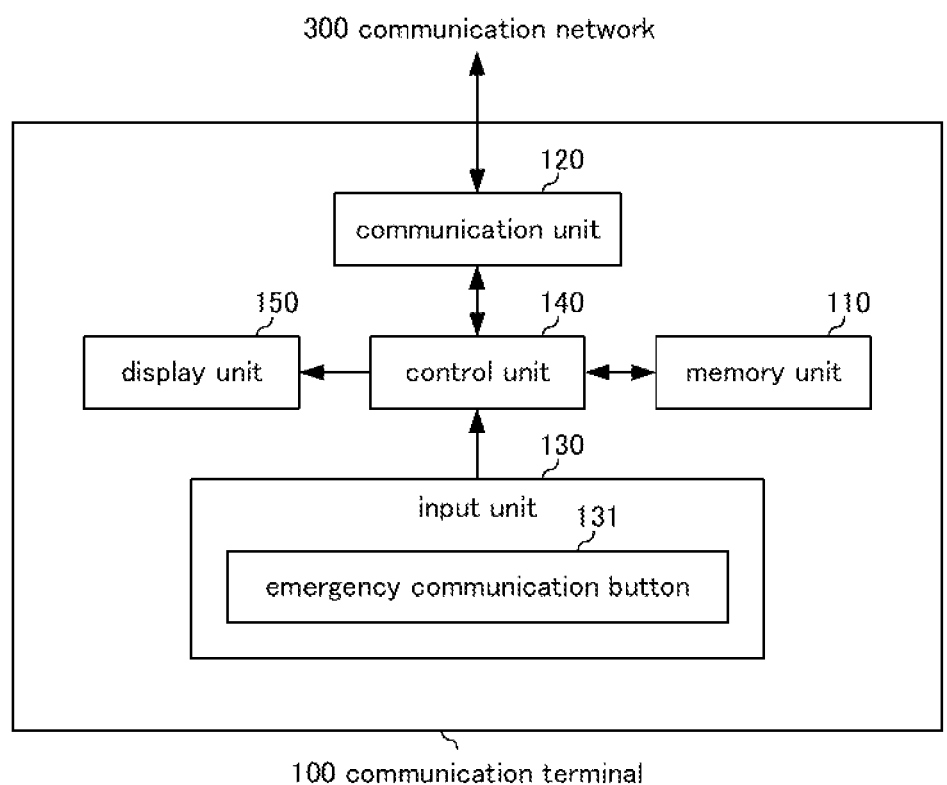
FIG. 2 shows an example of the internal configuration of the transmission-origin communication terminal shown in FIG. 1.

As shown in FIG. 2, communication terminal 100 shown in FIG. 1 is provided with: memory unit 110, communication unit 120, input unit 130, control unit 140, and display unit 150. Input unit 130 is further provided with emergency communication button 131. FIG. 2 shows, from among the constituent elements provided in communication terminal 100 shown in FIG. 1, an example of the principal constituent elements relating to the present exemplary embodiment.

Memory unit 110 stores a plurality of tables, each of the tables storing information required for processing. The tables that are stored by memory unit 110 include an object person table, a condition table, a presence table, and an order table.

As shown in FIG. 3, the object person table that is stored in memory unit 110 shown in FIG. 2 is of a configuration in which display names, object person IDs, telephone numbers, and the order of priority of the initial setting are placed in correspondence. The object person IDs are unique IDs (Identification) that are conferred in advance to object persons who have been registered in advance as the transmission destinations of emergency call origination from communication terminal 100. The display names are the names of the object persons when displaying on display unit 150 object persons who have been conferred with object person IDs. The telephone numbers are the telephone numbers of the communication terminals belonging to the object persons to whom object person IDs have been conferred. The order of priority of the initial setting is the order of priority of the initial setting of call origination when communication terminal 100 is to make an emergency call origination. The order of priority may be represented using numbers or may be represented using characters or symbols. When the order of priority is represented using numbers, a greater number may indicate a higher order of priority, or a smaller number may indicate a higher order of priority. An example is here described in which smaller numbers indicate higher orders of priority.

When the order of priority of the initial setting of the display name "Papa" is "2," the order of priority of the initial setting of the display name "Mama" is "1" and the order of priority of the initial setting of the display name "Grandpa" is "3" as shown in FIG. 3, the order of priority of the initial setting of emergency call origination is in the order of "Mama," "Papa," and "Grandpa." The order of priority for the transmission destinations of emergency call origination from communication terminal 100 is thus conferred in advance and stored in the object person table. In addition, there may be a plurality of orders of priority of the initial setting, and the orders of priority of the initial setting may be set according to conditions such as time. For example, the order of priority of the initial setting from 6:00 to 15:00 may be set in the order of "Grandpa," "Mama," and "Papa," and the order of priority of the initial setting from 15:00 to 24:00 may be set in the order of "Mama," "Papa," and "Grandpa."

As shown in FIG. 4, the condition table that is stored in memory unit 110 shown in FIG. 2 is of a configuration in which presence and order of priority are placed in correspondence. Presence indicates states that can be the states of communication terminals 200-1-200-3 that are the transmission destinations. For example, as shown in FIG. 4, presence takes "telephone-able" as a state in which communication terminals 200-1-200-3 can answer a telephone call (can receive a telephone call) and "telephone-unable" as a state in which communication terminals 200-1-200-3 are unable to answer a telephone call (cannot receive a telephone call). In addition, the order of priority indicates the order of priority of presence that is stored in the condition table.

As shown in FIG. 4, when the order of priority of the presence "telephone-able" is "1" and the order of priority of the presence "telephone-unable" is "2," the order of priority of emergency call origination is in the order "telephone-able" and "telephone-unable." Still further, "partially telephone-able" may be further provided, and the order of priority of this condition may be between "telephone-able" and "telephone-unable."

As shown in FIG. 5, the presence table that is stored in memory unit 110 shown in FIG. 2 is of a configuration in which object person IDs and presence are placed in correspondence. In this presence table, states (presence) of communication terminals 200-1-200-3 that are indicated by the status information that has been transmitted from communication terminals 200-1-200-3 that belong to object persons to whom object person IDs have been conferred are stored for each object person ID.

Figure 6:
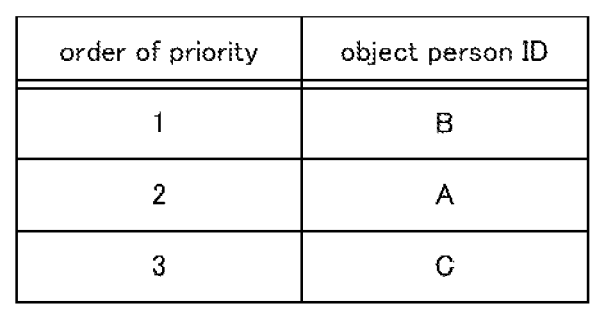

As shown in FIG. 6, the order table that is stored in memory unit 110 shown in FIG. 2 is of a configuration in which orders of priority and object person IDs are placed in correspondence. This correspondence is determined by control unit 140 based on information stored in each of the previously described tables. The method of this determination will be described hereinbelow.

Communication unit 120 carries out communication with communication terminals 200-1-200-3 by way of communication network 300.

Input unit 130 receives as input predetermined information based on the operation of the user who possesses communication terminal 100. For example, input unit 130 may be the button key of each of the keys provided on a keyboard or a mouse or may be constituted by a touch panel realized as a single unit with display unit 150. In addition, emergency communication button 131 that is provided in input unit 130 is a button that the user of communication terminal 100 presses or selects in the event of an emergency for implementing call origination to transmission destinations that have been registered in advance. Emergency communication button 131 may be a button key that is physically provided for the exclusive purpose of emergency communication, or, when input unit 130 constitutes a touch panel as a single unit with display unit 150, may be button image that is displayed on display unit 150.

Control unit 140 determines the order of priority of transmission destinations that are stored in the object person table based on presence that is stored in the condition table and presence table of memory unit 110.

When a plurality of transmission destinations have the same order of priority as a result of the setting (provisional determination) of the order of priority of transmission destinations (the order of priority that is stored in the order table) by control unit 140 based on the order of priority of states (presence) that are stored in the condition table and presence that is stored in the presence table, "action conditions," such as the order of priority of the initial setting that is stored in the object person table, the order of recent call originations, or the order display names according to the Japanese syllabary, may be separately prepared and the order of priority of transmission destinations that have the same order of priority may then be determined based on these "action conditions."

In addition, control unit 140 may alter the order of priority of initial setting based on the order of priority of states (presence) that are stored in the condition table and presence that is stored in the presence table and then determine the order of priority of transmission destinations (the order of priority that is stored in the order table).

Three examples regarding the actual processing when using the "order of priority of initial setting" are next described with reference to FIGS. 7A-7C. In the following examples, the object person table such as shown in FIG. 3 and the condition table shown in FIG. 4 are stored in memory unit 110 shown in FIG. 2.

Figure 7A:
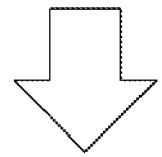
FIG. 7A shows a first example of the order of priority that is stored in the order table when the control unit has determined the order of priority of transmission destinations based on presence that is stored in the presence table of the memory unit shown in FIG. 2.

When all of the presences of object person IDs "A," "B," and "C" that are stored in the presence table are "telephone-able" as shown in the upper table of FIG. 7A, applying the condition table results in the same order of priority for the presence of all object persons. As a result, as shown in the lower table of FIG. 7A, control unit 140 determines the order of priority of the initial setting that is stored in the object person table as the order of priority "B"-"A"-"C" of the order table and stores this result in memory unit 110.

Figure 7B:
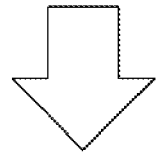
FIG. 7B shows a second example of the order of priority that is stored in the order table when the control unit has determined the order of priority of transmission destinations based on presence that is stored in the presence table of the memory unit shown in FIG. 2.

If the presence of object person IDs "A" and "C" stored in the presence table is "telephone-able" and the presence of object person ID "B" is "telephone-unable" as shown in the upper table of FIG. 7B, applying the condition table results in a higher order of priority of the presence of object person IDs "A" and "C" than the order of priority of the presence of object person ID "B." As a result, based on the order of priority of the initial setting that is stored in the object person table, control unit 140 leaves unchanged the order "A"-"C" of the order of priority of the initial setting of object person IDs "A" and "C" and alters the order of priority of object person ID "B" to an order of priority lower than the order of priority of object person IDs "A" and "C" to determine the order of priority "A"-"C"-"B" of the order table and stores the result in memory unit 110, as shown in the lower table of FIG. 7B.

Figure 7C:
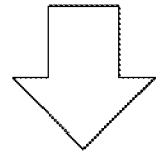
FIG. 7C shows a third example of the order of priority that is stored in the order table when the control unit has determined the order of priority of transmission destinations based on presence that is stored in the presence table of the memory unit shown in FIG. 2.

When the presence of object person ID "C" that is stored in the presence table is "telephone-able" and the presence of object person IDs "A" and "B" is "telephone-unable" as shown by the upper table of FIG. 7C, applying the condition table makes the presence of object person ID "C" a higher order of priority than the order of priority of the presence of object person IDs "A" and "B." As a result, based on the order of priority of the initial setting that is stored in the object person table, control unit 140 leaves the order "B"-"A" of the order of priority of the initial setting of object person IDs "B" and "A" unchanged but makes them ("B" and "A") lower than the order of priority of object person ID "C" to determine the order of priority "C"-"B"-"A" of the order table and stores the result in memory unit 110, as shown in the lower table of FIG. 7C.

Upon receiving predetermined input, such as when emergency communication button 131 is pressed or selected, control unit 140 implements call origination according to the altered order of priority, i.e., to the transmission destination having the highest order of priority that is stored in the order table of memory unit 110. If the transmission destination does not respond despite the passage of a predetermined time interval from the implementation of the call origination to the transmission destination having the highest order of priority, i.e., if the person of the transmission destination does not take the call, control unit 140 implements call origination to the transmission destination of the next highest order of priority.

Display unit 150 is a display that displays information such as characters or images. As previously described, display unit 150 and input unit 130 may be of a configuration that constitutes a touch panel. In addition, display unit 150 displays the display names of transmission destinations that have registered in advance (these may include telephone numbers) in the order of priority that was determined by control unit 140, i.e., the order of priority that is stored in the order table.

Figure 8:
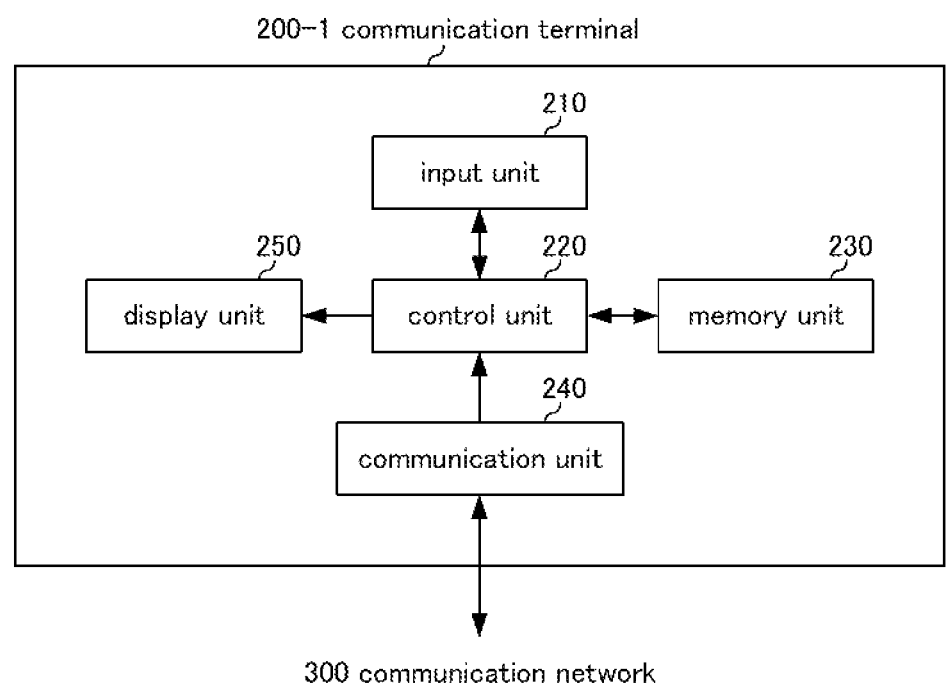
FIG. 8 shows an example of the internal configuration of the transmission destination communication terminal shown in FIG. 1.

As shown in FIG. 8, input unit 210, control unit 220, memory unit 230, communication unit 240, and display unit 250 are provided in communication terminal 200-1 shown in FIG. 1. In addition, FIG. 8 shows an example of, of the constituent elements that are provided in communication terminal 200-1 shown in FIG. 1, the principal constituent elements related to the present exemplary embodiment. Communication terminals 200-2-200-3 shown in FIG. 1 are also provided with the same constituent elements as those shown here.

Input unit 210 receives as input predetermined information based on the operation of the user that has communication terminal 200-1. For example, input unit 210 may be each of the keys and buttons provided on a keyboard or a mouse, or may be unified with display unit 250 to constitute a touch panel.

Control unit 220 writes status information that was received as input through the use of input unit 210 in memory unit 230. In addition, control unit 220 uses communication unit 240 to transmit status information that is stored in memory unit 230 on communication network 300. The timing at which control unit 220 transmits status information may be the timing at which input unit 210 receives predetermined input, or may be a timing that uses a time or a period that was set in advance.

Memory unit 230 stores information that was written by control unit 220. In addition, memory unit 230 stores programs and data that are necessary for control unit 220 to carry out processing. Memory unit 230 further stores address information (for example, electronic mail addresses) of communication terminal 100 that is the emergency call originator that is set with its own station as the object person.

Communication unit 240 performs communication with communication terminal 100 by way of communication network 300.

Display unit 250 is a display that displays information such as characters or images. As previously described, a touch panel may be constituted by display unit 250 and input unit 210.

Figure 9:
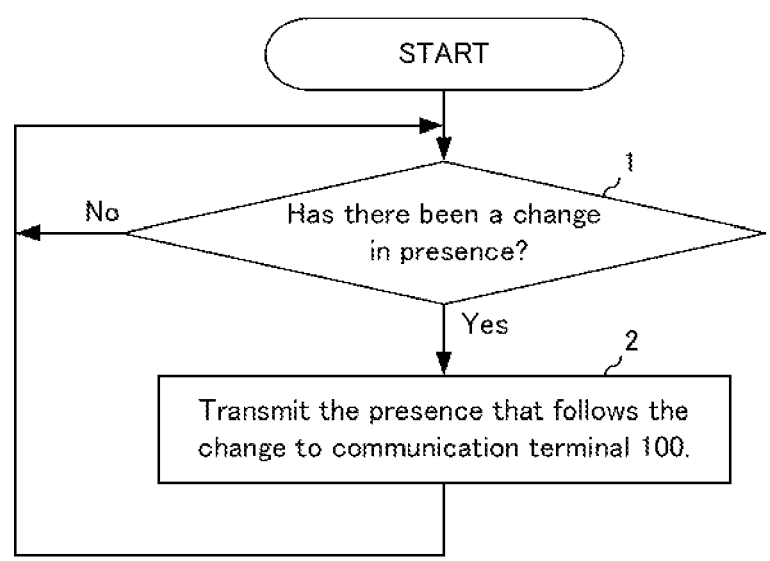
FIG. 9 is a flow chart for describing an example of the processes of registration (alteration) and transmission of presence in the transmission destination communication terminal shown in FIG. 1.

The communication method in the form shown in FIG. 1 is next described. The processes of transmission and registration (alteration) of presence in communication terminals 200-1-200-3 is first described with reference to FIG. 9.

In Step 1, control unit 220 first judges whether a change has occurred in the presence that is stored in memory unit 230. If control unit 220 judges that a change has occurred in presence that is stored in memory unit 230, control unit 220 in Step 2 uses communication unit 240 to transmit status information indicating the presence that follows the change to communication terminal 100 on communication network 300. At this time, control unit 220 includes the object person ID that was conferred in advance to communication terminal 200-1 in the status information and transmits status information using the previously described address information. Needless to say, the transmission of this status information is of a format that enables communication terminal 100 to recognize this information as a request to alter presence. The timing of the transmission of status information is not limited to times at which a change in presence occurs and may include times at which input unit 210 receives predetermined input or at timings that use a time or period that has been set in advance.

Several patterns can be considered for the processing up to carrying out the above-described judging process of Step 1.

As the first process, there is a pattern in which a user manipulates input unit 210 to apply presence as input. An example is here described in which control unit 220 activates a dedicated application and input unit 210 receives input of presence.

When control unit 220, through the manipulation of input unit 210 by a user, receives an instruction to activate an application, control unit 220 activates an application that is stored in memory unit 230, whereupon display unit 250 displays a menu based on the processing of the application that was activated. This menu includes a display for executing a process for altering (entering) presence.

After display unit 250 has displayed the menu and when input unit 210 has received input for selecting a display for altering presence, the presence that is currently stored in memory unit 230, an input column for entering the presence that follows alteration, and a determination button for transmitting the presence that follows the alteration that was entered are displayed. The presence that follows alteration is then entered, and when input unit 210 has accepted the selection of the determination button, control unit 220 alters the presence that is stored in memory unit 230 to the presence for which input was received and judges that the presence has been altered.

As the second process, there is a pattern in which memory unit 230 stores in advance the schedules of users and in which presence is altered at the start times or end times of events that are contained in these schedules.

First, when control unit 220 accepts an instruction for the input of a user's schedule by the manipulation of input unit 210 by the user, control unit 220 writes the schedule that was entered in memory unit 230.

Then, at times of the start or end of events that are contained in the schedule that is stored in memory unit 230, control unit 220 alters the presence that is stored in memory unit 230 based on the event and judges that an alteration of the presence has occurred. For example, when the current presence is "telephone-able" and the start of a meeting from 10:00 is stored in a schedule that is stored in memory unit 230, control unit 220 alters the presence that is stored in memory unit 230 to "telephone-unable" at 10:00. It is presumed that memory unit 230 has already stored in advance presence that accords with events such that the presence is "telephone-unable" for the event "meeting."

As the third process, there is a pattern in which a human sensor or camera (hereinbelow referred to as "sensor") that uses infrared rays is provided in communication terminal 200-1, the existence of a user in the vicinity of communication terminal 200-1 is judged based on the detection result of this sensor, and the presence is altered accordingly.

For example, starting from a state in which the sensor detects that the user is present in the vicinity of communication terminal 200-1, when the sensor no longer detects that the user is present in the vicinity of communication terminal 200-1, control unit 220 alters the presence that is stored in memory unit 230 from "telephone-able" to "telephone-unable."

Figure 10:
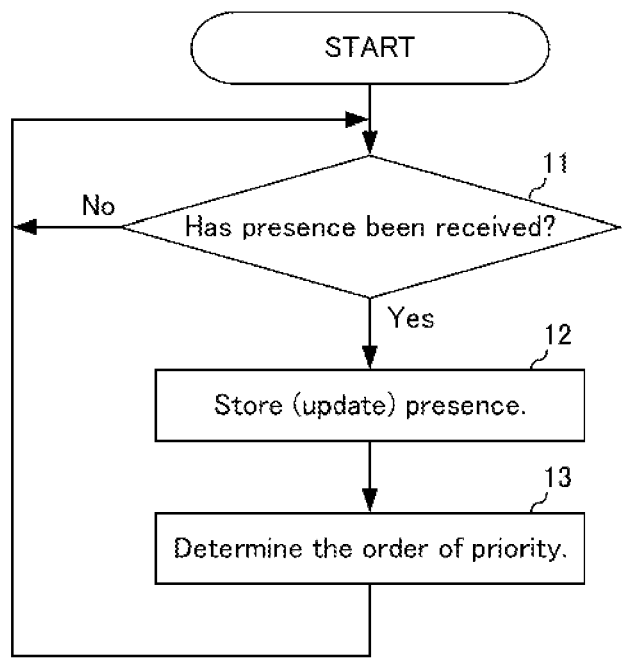
FIG. 10 is a flow chart for describing an example of the process of determining order of priority using the presence in the transmission-origin communication terminal shown in FIG. 1.

The process of determining the order of priority through the use of presence in communication terminal 100 shown in FIG. 1 is next described with reference to FIG. 10.

First, when communication unit 120 receives status information that was transmitted from communication terminals 200-1-200-3 in Step 11, control unit 140 writes the presence that is contained in the received status information to memory unit 110 in Step 12. Control unit 140 hereupon alters the presence that is placed in correspondence with the object person ID that is contained in the status information that was received in the presence table of memory unit 110. Control unit 140 next determines the order of priority of the transmission destinations based on the presence that is stored in memory unit 110 in Step 13. The details of the process of determining the order of priority are as described using FIGS. 7A-7C.

Figure 11:
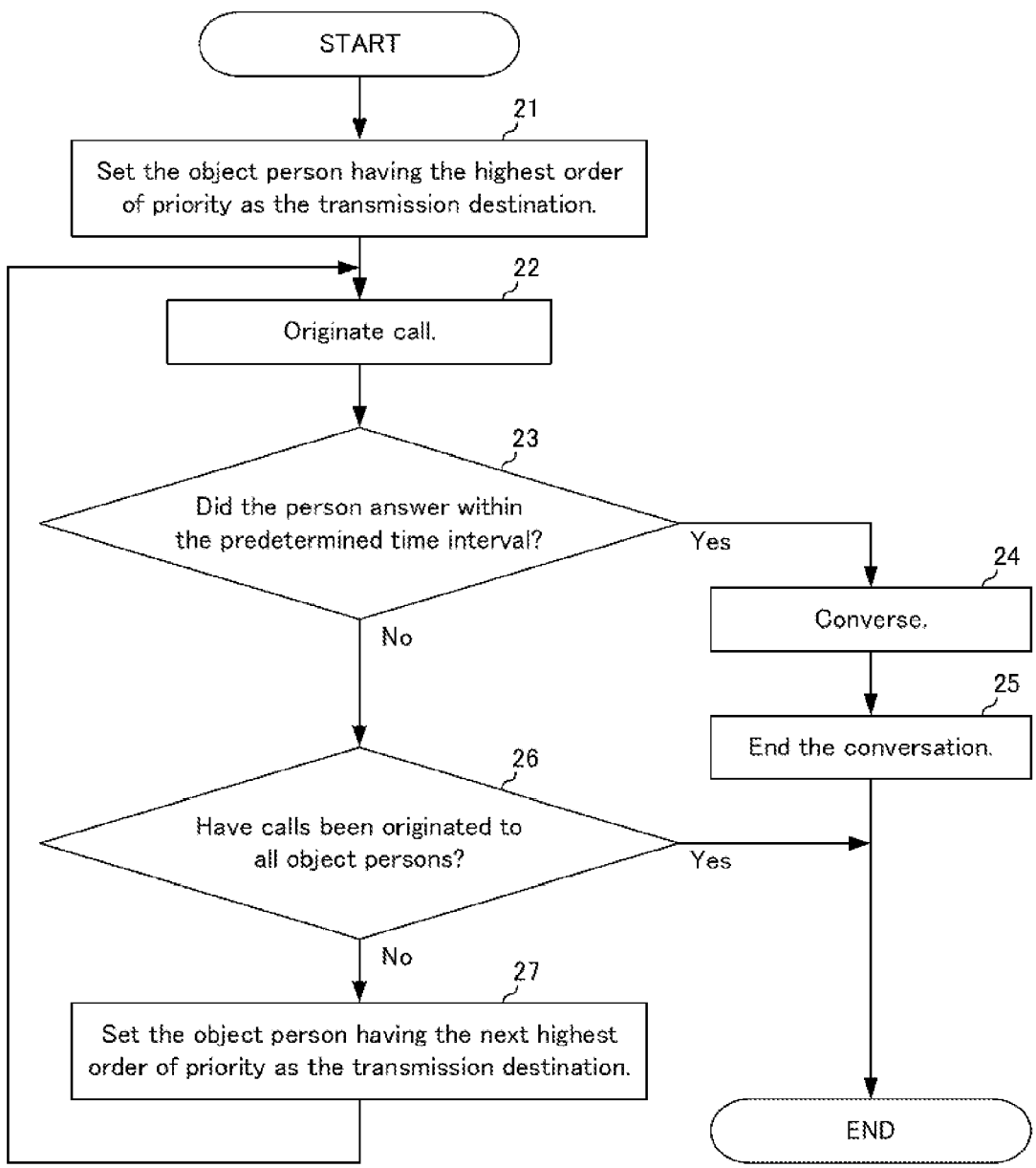
FIG. 11 is a flow chart for describing an example of the process of call origination in the transmission-origin communication terminal shown in FIG. 1.

The process of call origination in communication terminal 100 shown in FIG. 1 is next described with reference to FIG. 11.

First, when input unit 130 receives the selection (pressing) of emergency communication button 131, control unit 140 reads the object person ID having the highest order of priority in the order table that is stored in memory unit 110. Next, in Step 21, control unit 140 reads the telephone number that is placed in correspondence with the object person ID that was read from the object person table that is stored in memory unit 110 and sets the telephone number as the transmission destination. In Step 22, control unit 140 then originates a call to the telephone number that was set. At this time, control unit 140 may read both the telephone number and display name from the object person table that is stored in memory unit 110, and display unit 150 may carry out both display of the display name and display that indicates the state that a call is being originated to the transmission destination.

In Step 23, control unit 140 judges whether the transmission destination responds before the passage of a predetermined time (number of rings) from carrying out call origination, i.e., whether the person of the transmission destination answers the telephone call. If the transmission destination responds before the passage of the predetermined time interval from carrying out call origination, control unit 140 begins the conversation in Step 24 and ends the conversation in Step 25 when the conversation is cut off. Display unit 150 may perform a display indicating that conversation is in progress during the conversation. In addition, display unit 150 may also perform display indicating the end of the conversation when the conversation has ended.

On the other hand, when the transmission destination does not respond before the passage of a predetermined time interval from the implementation of call origination, control unit 140 raises a flag in the object person ID of the transmission destination in the order table that is stored in memory unit 110. Rather than a flag, some element may be used that enables recognition that call origination has already been implemented to the call destination of this object person ID. Control unit 140 next, in Step 26, judges whether call origination has already been implemented to all object persons of the order table that is stored in memory unit 110 by checking flags in the order table that is stored in memory unit 110.

If call origination has not been implemented to all object persons of the order table that is stored in memory unit 110, control unit 140 reads the object person ID having the next highest order of priority in the order table that is stored in memory unit 110. In Step 27, control unit 140 next reads from the object person table that is stored in memory unit 110 the telephone number that is placed in correspondence with the object person ID that was read and sets this telephone number as the transmission destination. Control unit 140 then originates a call to the telephone number that was set.

When call origination has already been implemented to all object persons of the order table that is stored in memory unit 110 in Step 26, display unit 150 displays this state and the process is completed. Alternatively, the process of Step 21 may again be carried out.

Before the call origination of Step 22, display unit 150 displays the call origination button and display name of the transmission destination that was set in Step 21 or Step 27, and when the call origination button is selected, control unit 140 may implement call origination to the transmission destination. When the "Next" button is selected without selecting the call origination button, the telephone number corresponding to the object person ID having the next highest order of priority is set to the transmission destination, and display unit 150 displays the call origination button and display name of the transmission destination that was set. The call origination button and selection button may be predetermined buttons that are provided in advance on communication terminal 100.

Second Exemplary Embodiment

Figure 12:
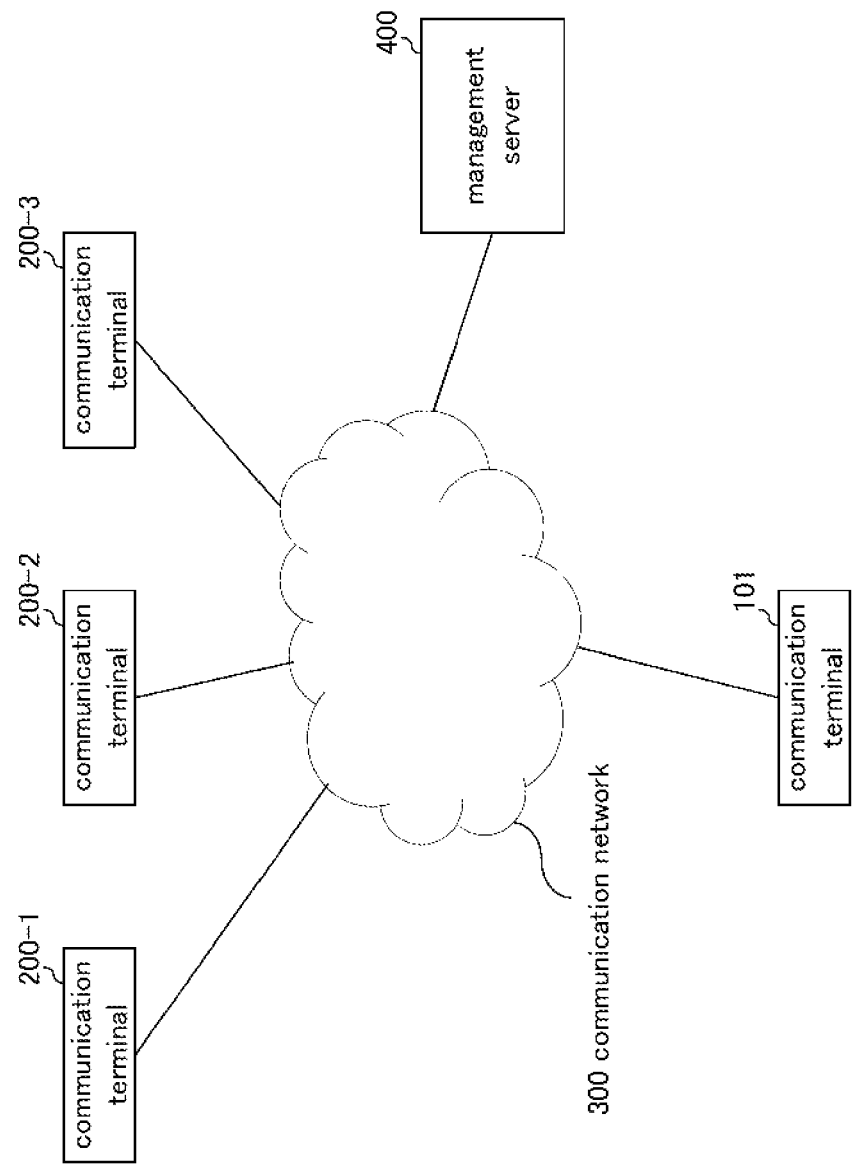
FIG. 12 shows the second exemplary embodiment of the communication system of the present invention.

Referring to FIG. 12, the second exemplary embodiment of the communication system of the present invention is depicted in which communication terminals 101 and 200-1-200-3 and management server 400 are able to communicate with each other by way of communication network 300. In the embodiment shown in FIG. 12, three communication terminals 200-1-200-3 are shown by way of example, but the number is not particularly stipulated.

Communication terminal 101 is a communication device (first communication terminal) equipped with an emergency call origination function. For example, communication terminal 101 is a communication device belonging to a child. In addition, communication terminal 101 implements presence inquiries to management server 400 at predetermined timings.

Communication terminals 200-1-200-3 are communication devices (second communication terminals) that are the objects of emergency transmission destinations of communication terminal 101. For example, communication terminals 200-1-200-3 are communication devices belonging to the guardians (such as the father, mother, and grandparents) of the child that has communication terminal 101. In addition, although communication terminals 200-1-200-3 in the first exemplary embodiment transmitted to communication terminal 101 status information that was receive as input, communication terminals 200-1-200-3 in the present exemplary embodiment transmit status information that has been received as input to management server 400. The internal configuration of communication terminals 200-1-200-3 is the same as that of the first exemplary embodiment.

Management server 400 stores status information that is transmitted from communication terminals 200-1-200-3. In addition, when there is an inquiry of presence from communication terminal 101, management server 400 transmits status information that indicates presence to communication terminal 101.

Figure 13:
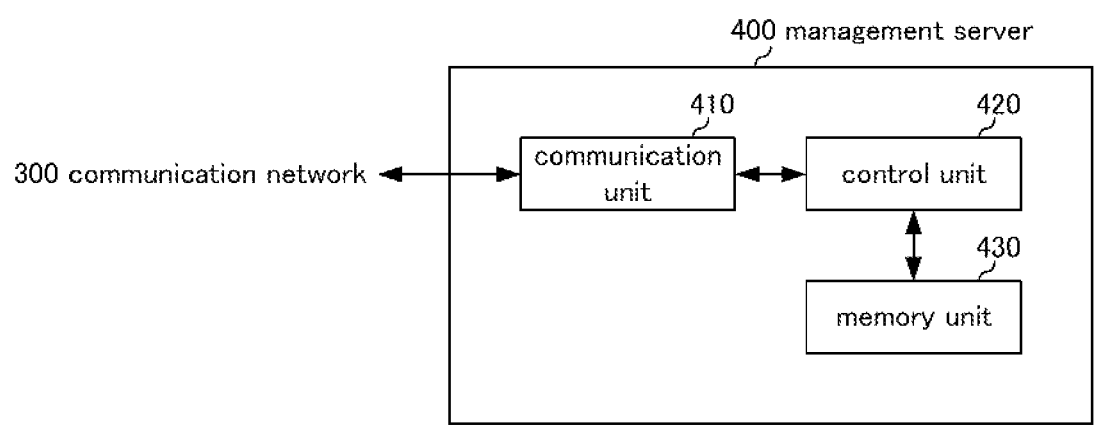
FIG. 13 shows an example of the internal configuration of the management server shown in FIG. 12.

As shown in FIG. 13, management server 400 shown in FIG. 12 is provided with communication unit 410, control unit 420, and memory unit 430. FIG. 13 shows an example of, from among the constituent elements provided in management server 400 shown in FIG. 12, the principal constituent elements relating to the present exemplary embodiment.

Communication unit 410 carries out communication with communication terminals 101 and 200-1-200-3 by way of communication network 300.

Control unit 420 writes status information that is transmitted from communication terminals 200-1-200-3 to memory unit 430. In addition, control unit 420 reads the status information that has been stored in memory unit 430 when there has been an inquiry of presence from communication terminal 101 and then uses communication unit 410 to transmit to communication terminal 101.

Memory unit 430 stores status information that was written by control unit 420. Memory unit 430 further stores call originator IDs and object person IDs in association with each other in advance. Call originator IDs are unique IDs that have been conferred in advance to the users who possess communication terminals that implement emergency call origination. The object person IDs are the same as those of the first exemplary embodiment. Memory unit 430 stores a plurality of tables, and each of these tables stores information required for processing. The tables stored by memory unit 430 include presence tables and user management tables.

As shown in FIG. 14, memory unit 430 shown in FIG. 13 stores a presence table in which object person IDs and presence are stored in association. This table is the same as the table (shown in FIG. 5) stored by memory unit 110 of communication terminal 100 in the first exemplary embodiment.

As shown in FIG. 15, memory unit 430 shown in FIG. 13 stores user management tables in which call originator IDs and object person IDs are placed in correspondence in advance. For example, the relation between a call originator to whom a call originator ID is conferred (the user of the communication terminal that is the call origination source) and an object person to whom an object person ID is conferred that is placed in correspondence with the call originator ID (the user of the communication terminal that is the transmission destination) can be considered to be a relation in which the object person is someone whom the call originator urgently wishes to contact in the event of an emergency, such as the relation between a child and parent, the relation between a grandchild and grandparent, a kinship relation, or the relation between a student and teacher.

Figure 16:
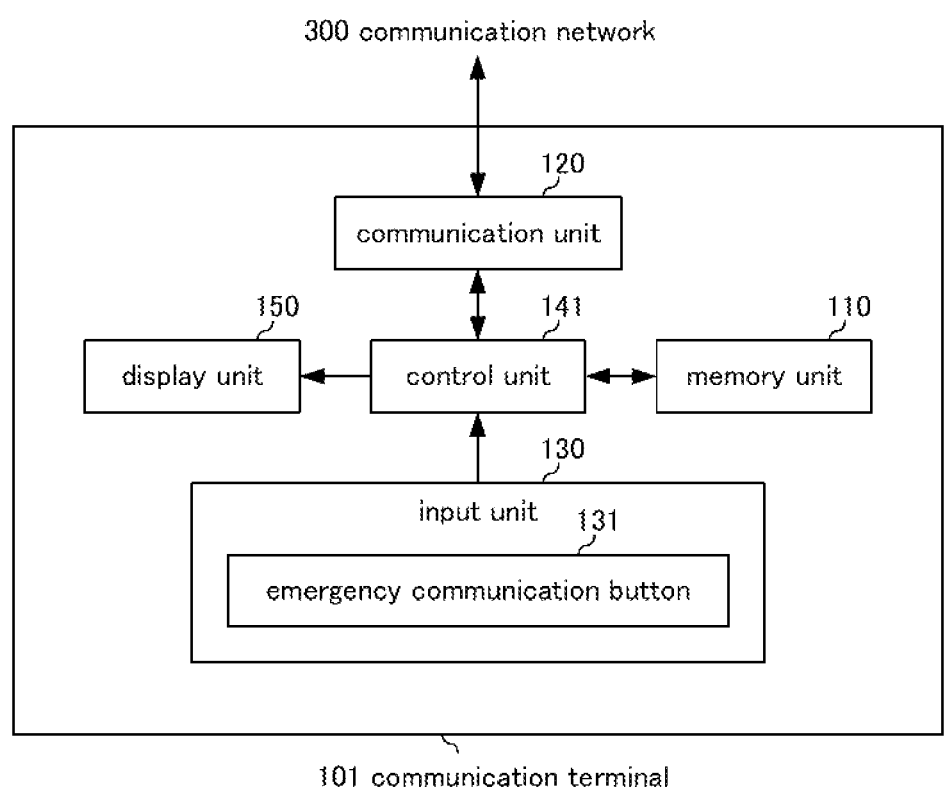
FIG. 16 shows an example of the internal configuration of the transmission-origin communication terminal shown in FIG. 13.

As shown in FIG. 16, communication terminal 101 shown in FIG. 12 is provided with memory unit 110, communication unit 120, input unit 130, control unit 141, and display unit 150. Input unit 130 is further provided with emergency communication button 131. FIG. 16 shows an example of, of the constituent elements provided in communication terminal 101 shown in FIG. 12, the principal constituent elements relating to the present exemplary embodiment.

Memory unit 110, communication unit 120, input unit 130, display unit 150, and emergency communication button 131 are the same as in the first exemplary embodiment shown in FIG. 2.

Control unit 141 uses communication unit 120 to inquire regarding presence to management server 400 at predetermined timings. These timings may be the times that input unit 130 receives predetermined input, may use a time or a period that has been set in advance, or may be the times of receiving notification from management server 400 indicating that a change has occurred in the presence of an object person ID that corresponds to the call originator ID. The transmission of a request signal that contains one's own call originator ID is used in this inquiry. Control unit 141 writes into the presence table of memory unit 110 the presence of each object person who is indicated in the status information that is transmitted in from management server 400 in response to the presence inquiry. At this time, control unit 141 may compare the presence that is indicated by the status information that was transmitted in from management server 400 with the presence that is already stored in the presence table of memory unit 110, and may write the presence indicated by the status information that was transmitted from management server 400 into the presence table of memory unit 110 only when these two presences differ, or may rewrite the presence without comparing. Control unit 141 alters the order of priority of initial setting that is stored in the object person table based on the presence that is stored in the condition table and presence table of memory unit 110, determines the order of priority of transmission destinations, and then stores the order of priority that was determined in the order table. The actual processing is the same as the processing in control unit 140 in the first exemplary embodiment. Control unit 141 further, upon receiving predetermined input such as when emergency communication button 131 is pressed or selected, implements call origination to the transmission destinations that has an order of priority that was altered, i.e., having the highest order of priority that is stored in the order table of memory unit 110. Control unit 141 implements call origination to the transmission destination having the next highest order of priority when the transmission destination fails to respond despite the passage of a predetermined time interval from the implementation of call origination to the transmission destination having the highest order of priority, i.e., when the person of the transmission destination does not answer the telephone.

Figure 17:
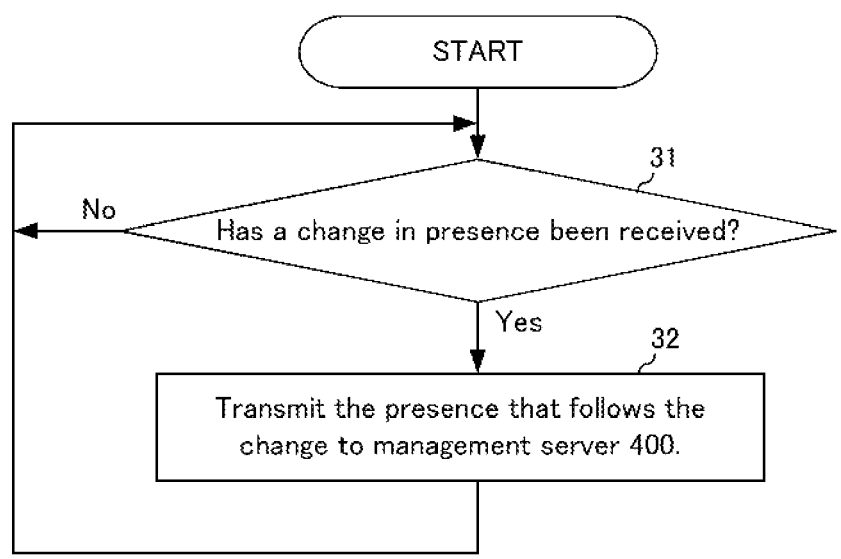
FIG. 17 is a flow chart for describing an example of the processes of registration (alteration) and transmission of presence in the transmission-destination communication terminal shown in FIG. 12.

The communication method in the exemplary embodiment described in FIG. 12 is next described. The processes of registration (alteration) and transmission of presence in communication terminals 200-1-200-3 are first described with reference to FIG. 17.

In Step 31, control unit 220 first judges whether a change has occurred in the presence that is stored in memory unit 230. When control unit 220 judges that a change has occurred in presence that is stored in memory unit 230, control unit 220 uses communication unit 240 to transmit status information indicating the presence that follows the change addressed to management server 400 on communication network 300 in Step 32. At this time, control unit 220 includes the object person ID that was conferred in advance to communication terminal 200-1 in the status information and transmits the result. Needless to state, the transmission is in a format that allows management server 400 to recognize this status information as a request to alter presence. The process up to the judging process of Step 31 described above is the same as described in the first exemplary embodiment.

Figure 18:
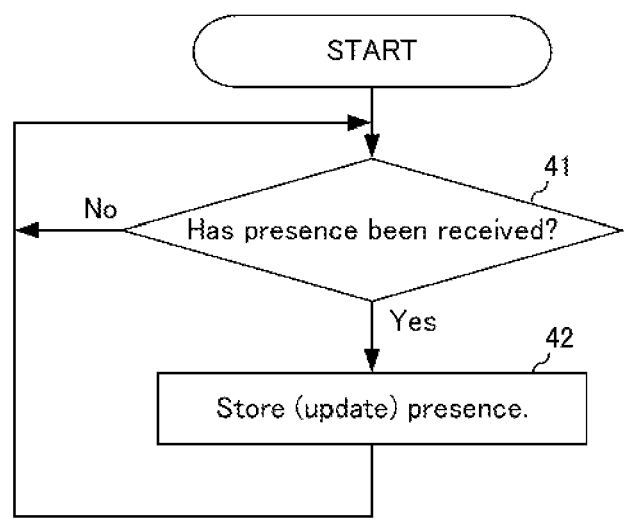
FIG. 18 is a flow chart for describing an example of the process of registration (alteration) of presence in the management server shown in FIG. 12.

The process of registering (altering) the presence in management server 400 shown in FIG. 12 is next described with reference to FIG. 18.

When communication unit 410 receives status information transmitted from communication terminals 200-1-200-3 in Step 41, control unit 420 writes the presence that is contained in the received status information to memory unit 430. At this time, control unit 420 alters the presence that is placed in correspondence with the object person ID that is contained in the received status information in the presence table of memory unit 430. When the object person ID that is contained in the received status information is not stored in the presence table of memory unit 430, control unit 420 newly adds the correspondence of the object person ID that is contained in the received status information and the presence in the presence table of memory unit 430.

Figure 19:
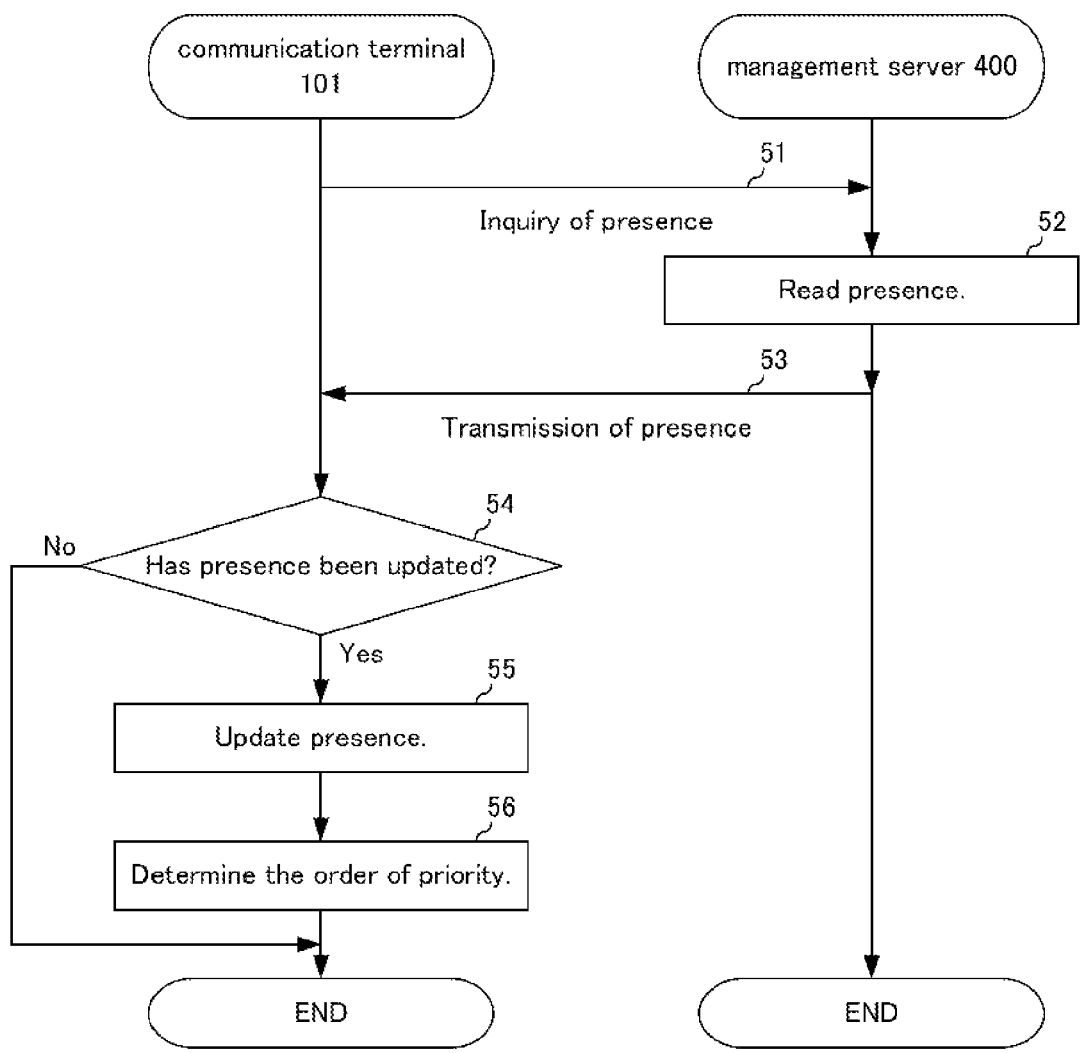
FIG. 19 is a sequence chart for describing an example of the process of determining the order of priority using presence in the transmission-origin communication terminal shown in FIG. 12.

The method of determining order of priority that uses presence in communication terminal 101 shown in FIG. 12 is next described with reference to FIG. 19.

In Step 51, when communication terminal 101 uses communication unit 120 to issue an inquiry of presence to management server 400, control unit 420 of management server 400 reads the object person ID that is placed in correspondence with the call originator ID that is contained in the inquiry request signal from the object person management table of memory unit 430. In Step 52, control unit 420 of management server 400 then reads, from the presence table of memory unit 430, the presence that is placed in correspondence with the object person ID that was read.

In Step 53, control unit 420 next uses communication unit 410 to transmit status information that includes the object person ID and presence that was read to communication terminal 101 by way of communication network 300. The electronic mail address, IP (Internet Protocol) address, MAC (Media Access Control) address, or telephone number of communication terminal 101 may be used as the information of the address that is used in this transmission.

In this case, control unit 420 may store the history of the transmission of status information to communication terminal 101 in memory unit 430, and when there is no change from the presence that is indicated in the status information that was previously transmitted, may use communication unit 410 to notify communication terminal 101 of this state without transmitting status information. Alternatively, control unit 420 may include, in the status information, information that indicates the date and time that status information was previously transmitted and then use communication unit 410 to transmit to communication terminal 101.

When communication unit 120 of communication terminal 101 receives the status information that was transmitted from management server 400, control unit 141 in Step 54 compares the presence that is indicated by the status information that was transmitted from management server 400 with the presence that is already stored in the presence table of memory unit 110 and judges whether these two presences differ, i.e., whether the presence has been updated. If control unit 141 judges that the presence has been updated, control unit 141 in Step 55 writes (overwrites) and updates the presence that is indicated by the status information that was transmitted from management server 400 in the presence table of memory unit 110. Alternatively, control unit 141 may also write (overwrite) the presence indicated by the status information that was transmitted from management server 400 in the presence table of memory unit 110 without carrying out the process of comparing in Step 54.

Next, in Step 56, control unit 141 determines the order of priority of transmission destinations based on the presence that was stored by memory unit 110. The details of the process of determining the order of priority are the same as described in the first exemplary embodiment.

As described previously, the timing at which management server 400 transmits status information to communication terminal is not only times when there is a request from communication terminal 101, and may be, for example, timings that use a time or period that was set in advance or may be times at which the presence table that is stored in memory unit 430 is updated.

The process of call origination in communication terminal 101 shown in FIG. 12 is the same as the process of call origination in communication terminal 100 shown in FIG. 1.

Third Exemplary Embodiment

Figure 20:
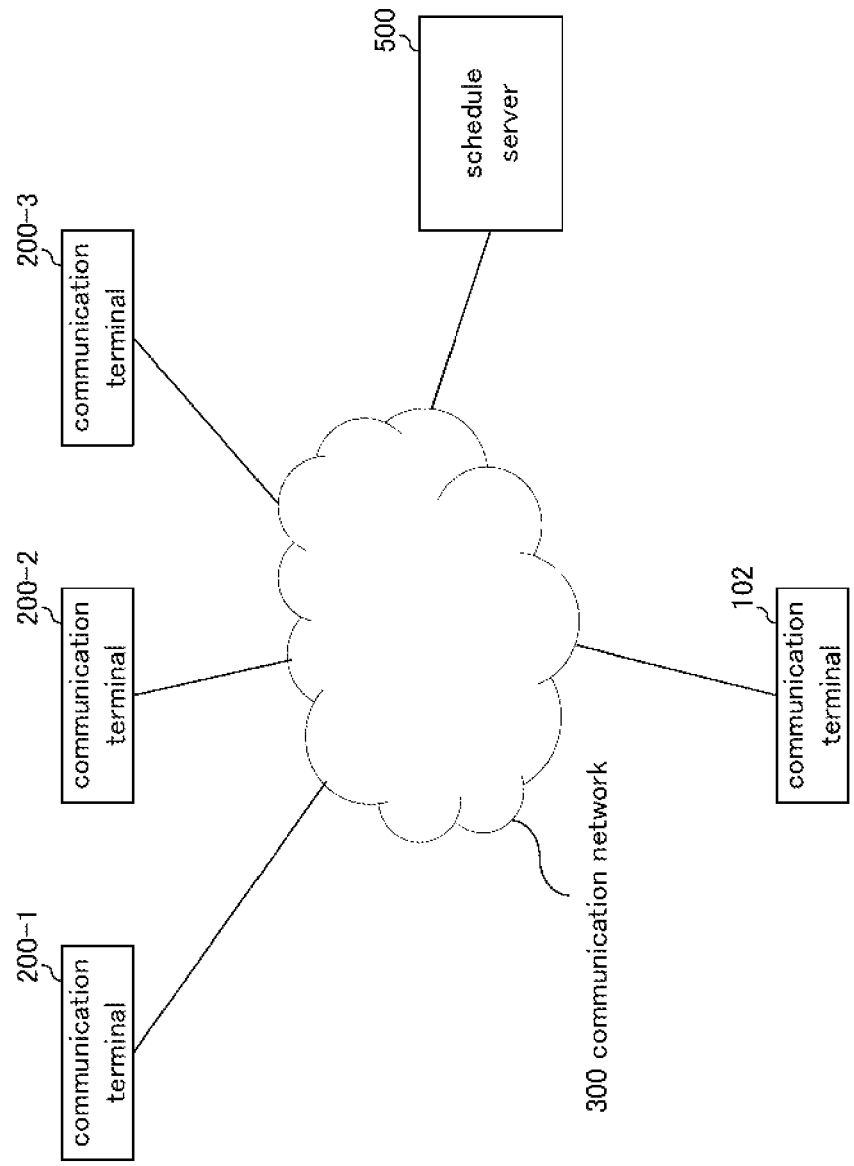
FIG. 20 shows the third exemplary embodiment of the communication system of the present invention.

Referring to FIG. 20, the third exemplary embodiment of the communication system of the present invention is shown in which communication terminals 102 and 200-1-200-3 and schedule server 500 are able to communicate with each other by way of communication network 300. The exemplary embodiment shown in FIG. 20 shows an example having three communication terminals 200-1-200-3, but this number is not particularly stipulated.

Communication terminals 200-1-200-3 are the same as in the first exemplary embodiment.

Schedule server 500 stores schedules of the users of communication terminals 200-1-200-3 in advance.

Figure 21:
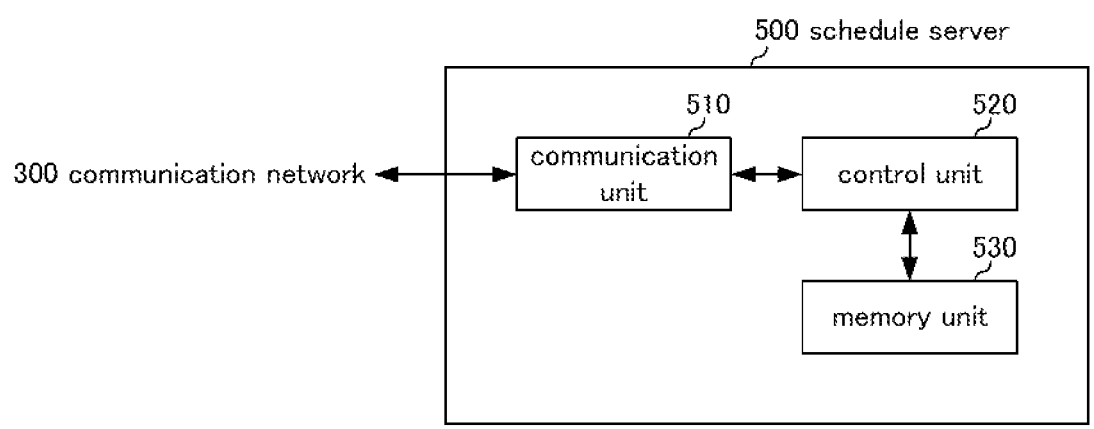
FIG. 21 shows an example of the internal configuration of the schedule server shown in FIG. 20.

As shown in FIG. 21, schedule server 500 shown in FIG. 20 is provided with communication unit 510, control unit 520, and memory unit 530. FIG. 21 shows an example of, from among the constituent elements provided in schedule server 500 shown in FIG. 20, the principal constituent elements relating to the present exemplary embodiment.

Communication unit 510 carries out communication with communication terminals 102 and 200-1-200-3 by way of communication network 300.

Control unit 520 writes in memory unit 530 schedule information that is transmitted from communication terminals 200-1-200-3. In addition, when there is a request from communication terminal 102 to acquire schedule information, control unit 520 reads schedule information that is stored in memory unit 530 and then uses communication unit 510 to transmit to communication terminal 102.

Memory unit 530 stores schedule information that was written by control unit 520. This schedule information places in association the object person IDs that are the objects and the schedules of these object persons that have been transmitted in from the communication terminals that belong to these object persons.

Figure 22:
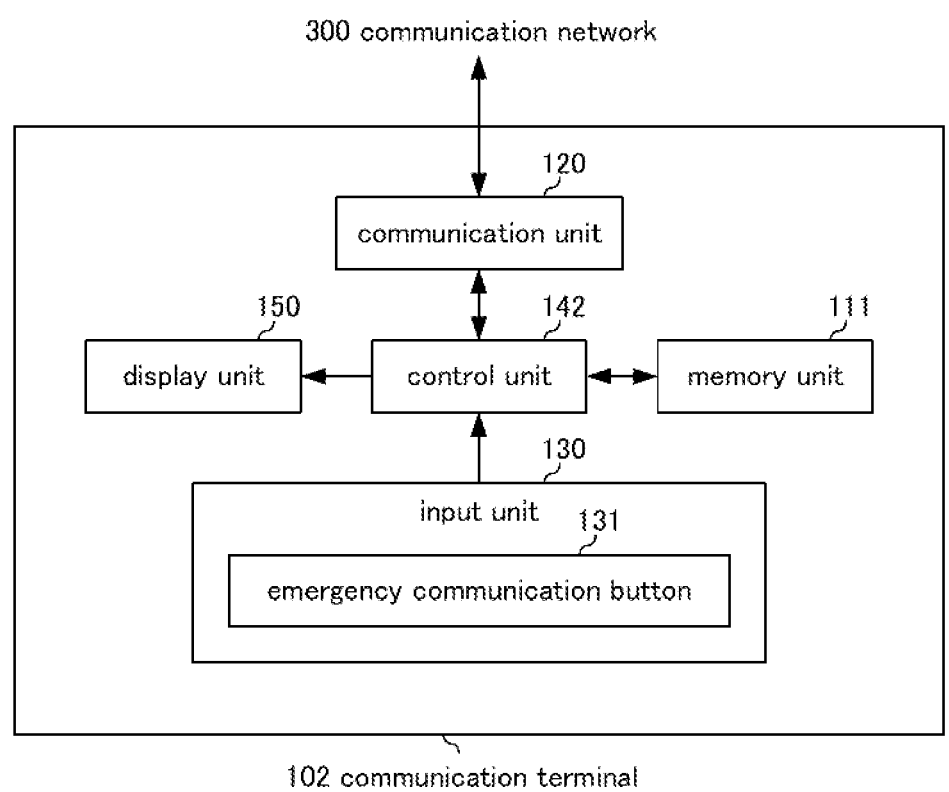
FIG. 22 shows an example of the internal configuration of the transmission-origin communication terminal shown in FIG. 20.

As shown in FIG. 22, communication terminal 102 (first communication terminal) that is shown in FIG. 20 is provided with memory unit 111, communication unit 120, input unit 130, control unit 142, and display unit 150. Emergency communication button 131 is further provided on input unit 130. FIG. 22 shows an example of, of the constituent elements provided in communication terminal 102 shown in FIG. 20, principal constituent elements relating to the present exemplary embodiment.

Communication unit 120, input unit 130, display unit 150 and emergency communication button 131 are the same as in the first exemplary embodiment shown in FIG. 2.

Control unit 142 uses communication unit 120 to issue requests for the acquisition of schedule information to schedule server 500 at predetermined timings. These timings may be times at which input unit 130 receives predetermined input, or may be times that use times or periods that have been set in advance or the times of receiving notification from schedule server 500 indicating that a change has occurred in the schedule of an object person ID that corresponds to a call originator ID. In addition, the transmission of a request signal that includes object person IDs are used for these requests. Schedule server 500 may further be configured to accept a request when an authentication process that uses an ID or password is carried out to access schedule server 500 and this authentication succeeds. Control unit 142 writes in the schedule table of memory unit 111 the schedule information that is transmitted from schedule server 500 in response to a request to acquire schedule information. Control unit 142 is further provided with a clock and thus changes presence based on a status that accords with a schedule that has started or ended at the time of the start or end of an event that is included in a schedule that is stored in the schedule table of memory unit 111 and then determines order of priority based on the presence that was changed. The actual process will be described hereinbelow.

Memory unit 111 stores a plurality of tables and stores information necessary for processing in these tables. The tables that are stored by memory unit 111 include a schedule table and an event table in addition to an object person table, condition table, presence table, and order table that are stored by memory unit 110 shown in FIG. 2. The object person table, condition table, presence table, and order table are the same as the tables stored by memory unit 110 shown in FIG. 2.

As shown in FIG. 23, the schedule table that is stored in memory unit 111 shown in FIG. 22 is of a form in which object person IDs and schedules are placed in correspondence. In addition, the schedules place events in association with the start times and end times of these events.

For example, as shown in FIG. 23, object person ID "A," start time "10:00" of the schedule, end time "12:00" of the schedule, and the event "in-company meeting" are placed in correspondence. This information indicates that the object person for whom the object person ID is "A" is scheduled to participate in an in-company meeting from 10:00 until 12:00. In addition, object person ID "A," schedule start time "15:00," schedule end time "17:00," and event "arrangements with client" are placed in correspondence. This information indicates that the object person for whom the object person ID is "A" is scheduled to make arrangements with a client from 15:00 to 17:00.

As shown in FIG. 24, the event table that is stored in memory unit 111 shown in FIG. 22 is of a form in which events are placed in correspondence with presence.

When the schedule table shown in FIG. 23 and the event table shown in FIG. 24 are stored in memory unit 111, control unit 142 changes the presence of object person ID "A" in the presence table that is stored in memory unit 111 from "telephone-able" to "telephone-unable" at 10:00. In addition, control unit 142 changes the presence of object person ID "A" in the presence table that is stored in memory unit 111 from "telephone-unable" to "telephone-able" at 12:00. At 15:00, control unit 142 changes the presence of the object person ID "A" in the presence table that is stored in memory unit 111 from "telephone-able" to "telephone-unable." At 17:00, control unit 142 again changes the presence of object person ID "A" in the presence table that is stored in memory unit 111 from "telephone-unable" to "telephone-able."

Figure 25:
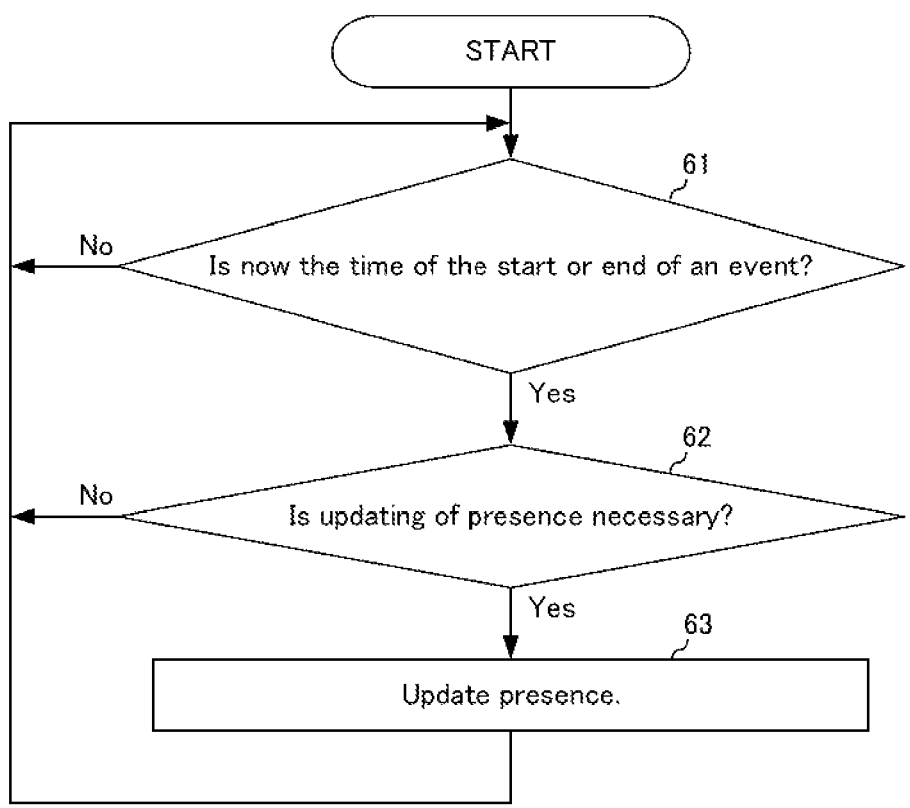
FIG. 25 is a flow chart for describing an example of the process of updating presence in the transmission-origin communication terminal shown in FIG. 20.

The process of updating the presence in communication terminal 102 shown in FIG. 20 is next described with reference to FIG. 25.

In Step 61, control unit 142 judges whether the current time is the start time or end time of an event of the schedule table that is stored in memory unit 111. If control unit 142 judges that the current time is the start time or end time of an event of the schedule table that is stored in memory unit 111, control unit 142 in Step 62 judges whether it is necessary to update (change) the presence that is stored in the presence table at the start or end of the event. For example, when the event table that is shown in FIG. 24 is stored in memory unit 111 and events for which presence is the same are continuing (for example, when the end time of an in-company meeting is 12:00, and the start time of making client arrangements is 12:00), control unit 142 judges that an updating (alteration) of the presence is not necessary.

Upon judging that updating (alteration) of the presence that is stored in the presence table is necessary at the start or end of the event, control unit 142 updates the presence of the presence table in Step 63.

The method of determining the order of priority and the call origination method following updating of presence are the same as in the first exemplary embodiment.

As in the second exemplary embodiment, management server 400 may be provided, management server 400 may store a schedule table and an event table, and presence of the presence table that is stored in memory unit 430 may be updated.

Other Examples of Call Origination

Although an example has been presented above in which origination is call origination of a telephone, origination may also be transmission of a message. The processing for a case in which origination is the transmission of a message is next described. The form shown in FIG. 1 is used in this explanation.

As shown in FIG. 26, the object person table that is stored in memory unit 110 shown in FIG. 2 is of a form that places display names, object person IDs, types, telephone numbers/ addresses, and order of priority of initial setting in correspondence. The object person IDs are unique IDs conferred in advance to object persons that have registered in advance as transmission destinations of emergency call origination from communication terminal 100. The display names are the names of object persons when display unit 150 displays object persons that have been conferred object person IDs. The types indicate whether the call origination is a telephone call or a message. The telephone numbers/addresses are the telephone numbers of communication terminals belonging to object persons that have been conferred object person IDs or addresses of the transmission destinations of messages. These addresses may be, for example, electronic mail addresses, IP addresses, SMS (Short Message Service) addresses, or SNS (Social Networking Service) accounts. The order of priority of the initial setting is the order of priority of the initial setting that is the basis of the order of priority of object persons when communication terminal 100 is to originate an emergency call.

As shown in FIG. 27, condition table that is stored in memory unit 110 shown in FIG. 2 is of a form that places presence and order of priority in correspondence. Presence indicates the possible states of communication terminals 200-1-200-3 that are the transmission destinations. As shown in FIG. 27, presence takes the state in which communication terminals 200-1-200-3 (regardless of whether able or unable to receive a message) can receive a telephone call (can answer a telephone call) as "telephone-able"; takes the state in which communication terminals 200-1-200-3 (although unable to receive a telephone call) can receive a message as "message-able"; and takes the state in which communication terminals 200-1-200-3 are unable to answer a telephone call (unable to receive a telephone call), and moreover, are unable to receive a message as "telephone unable, message unable." In addition, the order of priority indicates the order of priority of presence that is stored in the condition table. As shown in FIG. 27, when the order of priority of the presence "telephone-able" is "1," the order of priority of the presence "message-able" is "2," and the order of priority of the presence "telephone-unable, message-unable" is "3," the order of priority of emergency call origination is in the order "telephone-able," "message-able," and telephone-unable, message-unable."

As shown in FIG. 28, the presence table that is stored in memory unit 110 shown in FIG. 2 is of a form that places object person IDs and presence in correspondence. In this presence table, the states (presence) of communication terminals 200-1-200-3 that are indicated by status information that has been transmitted in from communication terminals 200-1-200-3 belonging to object persons to whom object person IDs have been conferred are stored for each object person ID. In addition, when SNS accounts are used as addresses, presence may be set to "message-able" or "message-unable" based on whether communication terminals 200-1-200-3 used IDs or passwords to log into the SNS service.

As shown in FIG. 29, order table that is stored in memory unit 110 shown in FIG. 2 is of a form that places order of priority and object person IDs in correspondence. This correspondence is determined by control unit 140 based on the information that is stored in each of the previously described tables.

Based on the object person table shown in FIG. 26, the order of priority of the initial setting of the telephone (hereinbelow referred to as "telephone B") and message (hereinbelow referred to as "message B") of object person ID "B" is higher than the order of priority of the initial setting of the telephone (hereinbelow referred to as "telephone A") and a message (hereinbelow referred to as "message A") of object person ID "A."

If the ranking of the order of priority is indicated by ">" or "<", then:

telephone B and message B>telephone A and message A

In addition, based on the condition table shown in FIG. 27:

telephone-able>message-able>telephone-unable and message-unable

Based on the presence table shown in FIG. 28, the object person of object person ID "A" is in a state that allows receiving a telephone call and is also in a state that allows receiving a message. In addition, the object person of object person ID "B" is in a state that does not allow receiving a telephone call, but is in a state that allows receiving a message. If these conditions are applied to the condition table, then:

telephone A>message A=message B>telephone B and because message A and message B are at the same order of priority, the order of priority of the initial setting of the object person table "message B>message A" is applied.

Based on the foregoing explanation, control unit 140 determines the order of priority:

telephone A>message B>message A>telephone B and control unit 140 writes this order to the order table (FIG. 29).

The messages that are sent may be messages that are set in advance such as "must contact." If there is no reply or telephone call from the transmission destination despite the passage of a predetermined time interval from the transmission of the message, call origination is implemented to the next highest order of priority.

If a telephone call is made but the transmission destination is busy, call origination may be implemented to the next highest order of priority, or call origination may again be implemented to that transmission destination after the passage of a predetermined time interval.

As described hereinabove, the order of priority for implementing emergency call origination is determined based on the state of the communication terminal of the object person that is the transmission destination in the present invention, whereby wasteful waiting time can be eliminated when originating an emergency call.

The processes carried out by each of the constituent elements provided in communication terminals 100-102 described hereinabove may also be carried out by logic circuits each fabricated according to its purpose. Alternatively, a computer program (hereinbelow referred to as a "program") that describes the content of each process as a procedure may be recorded on a recording medium that can be read in communication terminals 100-102, and the program that is recorded on this recording medium may then be read and executed by communication terminals 100-102. The recording medium that can be read in communication terminals 100-102 refers to a relocatable recording medium such as a floppy disk (registered trademark), a magneto-optical disk, a DVD, or a CD, as well as to memory such as ROM or RAM or to an HDD that is incorporated in communication terminals 100-102. The program that is recorded on this recording medium is read in control units 140-142 that are provided in communication terminals 100-102, and processes equivalent to those described hereinabove are thus carried out under the control of control units 140-142. Here, control units 140-142 are components that operate as computers that execute the program that was read from the recording medium on which the program was recorded.

All or a portion of the above-described exemplary embodiments can also be described as in the Notes below, but is not limited to the following Notes.

Note 1

A communication terminal that includes:

a memory unit that stores a plurality of transmission destinations; and a control unit that, based on the states of the plurality of transmission destinations, determines an order of priority of transmission destinations and that, upon receiving predetermined input, implements call origination to the transmission destination having the highest order of priority of transmission destinations that was determined.

Note 2

The communication terminal as described in NOTE 1, wherein:

the memory unit stores status information that indicates, for each of the plurality of transmission destinations, the states of the plurality of transmission destinations that are transmitted from the plurality of transmission destinations; and the control unit determines the order of priority of transmission destinations based on the status information that is stored by the memory unit.

Note 3

The communication terminal as described in NOTE 1, wherein:

the memory unit stores in advance schedules of the object persons of the transmission destinations; and the control unit, based on states that accord with the schedules that have started or have ended, determines the order of priority of transmission destinations at the time of the start or end of an event that is contained in the schedules that are stored by the memory unit.

Note 4

The communication terminal as described in any one of NOTES 1 to 3, wherein:

the communication terminal further includes an emergency communication button; and when the emergency communication button is pressed or selected, the control unit receives the predetermined input.

Note 5

The communication terminal as described in any one of NOTES 1 to 4, wherein the communication terminal further includes a display unit that displays transmission destinations in the order of priority that was determined.

Note 6

The communication terminal as described in any one of NOTES 1 to 5, wherein, when call origination is carried out to the transmission destination having the highest order of priority but the transmission destination does not respond despite the passage of a predetermined time interval, the control unit carries out call origination to the transmission destination having the next highest order of priority.

Note 7

The communication terminal as described in any one of NOTES 1 to 6, wherein:

the memory unit stores the order of priority of initial setting of the plurality of transmission destinations and the order of priority of states of transmission destinations; and the control unit, based on the status information that is stored by the memory unit and the order of priority of states of transmission destinations, determines the order of priority of transmission destinations by altering the order of priority of the initial setting of the plurality of transmission destinations.

Note 8

The communication terminal as described in any one of NOTES 1 to 7, wherein:

the memory unit stores the order of priority of initial setting of the plurality of transmission destinations and the order of priority of the states of the transmission destinations; and the control unit, based on the status information that is stored by the memory unit and the order of priority of states of the transmission destinations, sets the order of priority of transmission destinations, and when a plurality of transmission destinations have the same order of priority, uses the order of priority of the initial setting of the plurality of transmission destinations to determine the order of priority of transmission destinations for the transmission destinations having the same order of priority.

Note 9

A communication terminal includes:

a memory unit that stores a plurality of transmission destinations;

a display unit that displays the transmission destinations that are stored by the memory unit; and a control unit that, based on the states of the plurality of transmission destinations, determines an order of priority of transmission destinations, that, upon receiving predetermined input, displays on the display unit the transmission destinations in order of the order of priority of transmission destinations that was determined, and upon selection of a displayed transmission destination, implements call origination to the transmission destination that was selected.

Note 10

A communication system that has a first communication terminal that implements call origination and a plurality of second communication terminals that are the transmission destinations of the call origination, wherein the communication system includes:

memory means; and control means that, based on the states of the plurality of second communication terminals, determines an order of priority of transmission destinations, and that, when the first communication terminal receives predetermined input, implements call origination to, from among the plurality of second communication terminals that are stored in association with the first communication terminal in the memory means, the second communication terminal having the highest order of priority of transmission destinations that was determined.

Note 11

A communication system that has a first communication terminal that implements call origination and a plurality of second communication terminals that are the transmission destinations of the call origination, wherein the communication system includes:

memory means that stores a plurality of the transmission destinations;

display means that displays the transmission destinations that are stored by the memory means; and control means that, based on the states of the plurality of second communication terminals, determines an order of priority of transmission destinations, when the first communication terminal receives predetermined input, displays on the display means, from among the plurality of second communication terminals that are stored in association with the first communication terminal in the memory means, transmission destinations in order of the order of priority of transmission destinations that was determined, and upon selection of a transmission destination that is displayed, implements call origination to the second communication terminal that is the transmission destination that was selected.

Note 12

A communication method includes:

a process of storing a plurality of transmission destinations;

a process of determining an order of priority of transmission destinations based on the states of the plurality of transmission destinations; and a process of, upon receiving predetermined input, implementing call origination to the transmission destination having the highest order of priority of transmission destinations that was determined.

Note 13

A communication method includes:

a process of storing a plurality of transmission destinations;

a process of displaying the transmission destinations that are stored;

a process of determining an order of priority of transmission destinations based on the states of the plurality of transmission destinations;

a process of, upon receiving predetermined input, displaying transmission destinations in order of the order of priority of transmission destinations that was determined; and a process of, when a transmission destination that is displayed is selected, implementing call origination to the transmission destination that was selected.

Note 14

A program for causing a computer to execute:

a procedure of storing a plurality of transmission destinations;

a procedure of determining an order of priority of transmission destinations based on the states of the plurality of transmission destinations; and a procedure of, upon receiving predetermined input, implementing call origination to the transmission destination having the highest order of priority of transmission destinations that was determined.

Note 15

A program for causing a computer to execute:

a procedure of storing a plurality of transmission destinations;

a procedure of displaying the transmission destinations that are stored;

a procedure of, based on the states of the plurality of transmission destinations, determining an order of priority of transmission destinations;

a procedure of, upon receiving predetermined input, displaying transmission destinations in order of the order of priority of transmission destinations that was determined; and a procedure of, upon selection of a transmission destination that is displayed, implementing call origination to the transmission destination that was selected.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A communication terminal comprising:
a memory unit that stores a plurality of transmission destinations, that stores an order of priority of initial setting of said plurality of transmission destinations and an order of priority of states of transmission destinations; and
a control unit that, based on the states of said plurality of transmission destinations, determines an order of priority of transmission destinations and that, upon receiving predetermined input, implements call origination to the transmission destination having the highest order of priority of said transmission destinations that was determined, based on the status information that is stored by said memory unit and the order of priority of states of transmission destinations, sets the order of priority of transmission destinations, and when a plurality of transmission destinations have the same order of priority, uses the order of priority of the initial setting of said plurality of transmission destinations to determine the order of priority of transmission destinations for the transmission destinations having the same order of priority.

2. A communication system that has a first communication terminal that implements call origination and a plurality of second communication terminals that are the transmission destinations of said call origination, comprising:
a memory unit that stores a plurality of transmission destinations, that stores the order of priority of initial setting of said plurality of transmission destinations and the order of priority of states of transmission destinations; and
a control unit that, based on the states of said plurality transmission destinations, determines an order of priority of transmission destinations, and that, upon receiving predetermined input, implements call origination to the transmission destination having the highest order of priority of said transmission destinations that was determined, based on the status information that is stored by said memory unit and the order of priority of states of transmission destinations, sets the order of priority of transmission destinations, and when a plurality of transmission destinations have the same order of priority, uses the order of priority of the initial setting of said plurality of transmission destinations to determine the order of priority of transmission destinations for the transmission destinations having the same order of priority.

3. A communication method comprising:

storing a plurality of transmission destinations;

storing an order of priority of initial setting of said plurality of transmission destinations and an order of priority of states of transmission destinations, determining an order of priority of transmission destinations based on the states of said plurality of transmission destinations;

upon receiving predetermined input, implementing call origination to the transmission destination having the highest said order of priority of transmission destinations that was determined;

setting the order of priority of transmission destinations based on a status information that is stored by a memory unit and an order of priority of states of transmission destinations, using an order of priority of the initial setting of said plurality of transmission destinations when a plurality of transmission destinations have a same order of priority; and determining the order of priority of transmission destinations for the transmission destinations having the same order of priority based on the status information that is stored by the memory unit and the order of priority of states of transmission destinations.

* * * * *